(12) United States Patent
Chen et al.

(10) Patent No.: US 8,427,476 B2
(45) Date of Patent: Apr. 23, 2013

(54) SYSTEM AND METHOD FOR AUTOMATICALLY ADJUSTING VISUAL SETTING OF DISPLAY DEVICE

(75) Inventors: Liang-Gee Chen, Taipei County (TW); Jing-Ying Chang, Taipei (TW); Yi-Min Tsai, Kaohsiung County (TW)

(73) Assignee: Acer Incorporated, Taipei Hsien (TW)

( * ) Notice: Subject to any disclaimer, the term of this patent is extended or adjusted under 35 U.S.C. 154(b) by 763 days.

(21) Appl. No.: 12/637,521

(22) Filed: Dec. 14, 2009

(65) Prior Publication Data

US 2011/0141114 A1 Jun. 16, 2011

(51) Int. Cl.
*G06T 17/00* (2006.01)
(52) U.S. Cl.
USPC .......................................... 345/428; 345/419
(58) Field of Classification Search .................... 345/428
See application file for complete search history.

(56) References Cited

U.S. PATENT DOCUMENTS

2007/0126884 A1* 6/2007 Xu et al. .................... 348/220.1

* cited by examiner

*Primary Examiner* — Said Broome
*Assistant Examiner* — Peter Hoang
(74) *Attorney, Agent, or Firm* — Young & Thompson

(57) ABSTRACT

A display system for improving visual comfort and a method of adaptively adjusting resolution of a display device are provided. The display system includes a display device, a memory, an image sensor, a face recognition unit, a distance detection unit, and a controller. The memory stores face representation data and user preference data. The image sensor captures an image and converts it into an electrical signal. The face recognition unit analyzes that electrical signal to recognize a face image and compares the recognized face image with the face representation data to generate a first signal. The distance detection unit analyzes the electrical signal to determine a distance between the display device and the user to generate a second signal. The controller then generates a parameter based on the first signal and the second signal and adjusts a display resolution of the display device based on the parameter.

3 Claims, 2 Drawing Sheets

SYSTEM AND METHOD FOR AUTOMATICALLY ADJUSTING VISUAL SETTING OF DISPLAY DEVICE

FIELD OF INVENTION

The present invention relates to a display system and a method for improving visual comfort, and more particularly, to a display system and a method capable of automatically adjusting resolution of a display device based on both of distance between a user and the display device and predetermined user preference data.

BACKGROUND OF THE INVENTION

The digital image is composed of discrete elements called pixels, and "pixel pitch", similar to "dot pitch" of a CRT display, is the physical distance between two adjacent pixels in a LCD display device and is one of the critical factors affecting image quality.

As known, the optimal viewing comfort can be achieved by making the width of screen occupy 45 degrees of visual angle. Table 1 shows the calculation results of visual angle per pixel for the display devices with different sizes. As clearly shown in Table 1, the visual angle per pixel is decided by the display resolution, irrespective of the size of the display device.

TABLE 1

| Size(Inch) | Width(mm) | Height(mm) | Res.(W) | Res.(H) | Pixel Pitch(mm) | Viewing Distance(cm) | Degree/Pitch |
|---|---|---|---|---|---|---|---|
| 15 | 304 | 228 | 1024 | 768 | 0.297 | 36.6959 | 0.0464 |
| 17 | 337.9 | 270 | 1280 | 1024 | 0.264 | 40.788 | 0.0371 |
| 19 | 376.3 | 301.1 | 1280 | 1024 | 0.294 | 45.4233 | 0.0371 |
| 19.0 W | 408.2 | 255.1 | 1440 | 900 | 0.283 | 49.2739 | 0.0329 |
| 20.1 W | 433.4 | 270.9 | 1680 | 1050 | 0.258 | 52.3158 | 0.0283 |
| 22.0 W | 473.8 | 296.1 | 1680 | 1050 | 0.282 | 57.1925 | 0.0283 |
| 24.0 W | 518.5 | 324 | 1920 | 1200 | 0.27 | 62.5883 | 0.0247 |
| 25.5 W | 550.1 | 343.8 | 1920 | 1200 | 0.287 | 66.4027 | 0.0248 |
| 27.5 W | 593.3 | 370.8 | 1920 | 1200 | 0.309 | 71.6174 | 0.0247 |
| 30.0 W | 641.3 | 400.8 | 2560 | 1600 | 0.2505 | 77.4115 | 0.0185 |

Generally, the website designer usually constructs web pages/sites with 800×600 or 1024×768 resolution, and under these resolution, characters consisted of the same number of dots will exhibit different pitch scales when being displayed on different display screens of different sizes, which may degrade the visibility of the content of the display.

Besides the physical viewing condition, the viewer's preference has an effect on the perceived quality of an image or a video. A user can change the magnification level by setting display properties. Various types of display screen magnification and zoom functionalities are provided in most of today's computer systems, which mainly use software to zoom the image or the video. However, adjusting preferred setting on the display devices is inconvenient for the user because a number of system interactions with the user are required and such interactions may be burdensome and time-consuming.

Consequently, it is necessary to provide a display system capable of automatically varying scale of displayed content to facilitate user viewing.

SUMMARY OF THE INVENTION

For obviating the problems due to limitations and disadvantages of the related arts, the present invention provides a display system and a method for automatically adjusting the contents of the display device, thereby providing both high visibility and high visual comfort without placing stress on a user.

According to an aspect of the present invention, a display system for improving visual comfort is provided. The display system includes a display device, a memory, an image sensor, a face recognition unit, a distance detection unit, and a controller. The memory is configured to store face representation data and user preference data. The image sensor is positioned with respect to the display device for capturing an image and converting the image into an electrical signal. The face recognition unit is configured to analyze the electrical signal to recognize a face image of a user and comparing the recognized face image with the face representation data to generate a first signal. The distance detection unit is configured to analyze the electrical signal to determine a distance between the display device and the user to generate a second signal. The controller, which is electrically connected to the face recognition unit and the distance detection unit, can generate a parameter based on the first signal and the second signal and adjust a display resolution of the display device based on the parameter.

According to another aspect of the present invention, a method of adaptively adjusting resolution of a display device is provided. The method includes the following steps: storing face representation data and user preference data in a memory; capturing an image and converting the image into an electrical signal by an image sensor; analyzing the electrical signal to recognize a face image of a user and determine a distance between the display device and the user; comparing the recognized face image with the face representation data to determine a match between the recognized face image and one of the face representation data; retrieving one of the user preference data corresponding to the recognized face image; generating a parameter based on the distance and the retrieved user preference data; and adjusting a display resolution of the display device based on the parameter.

The other aspects of the present invention, part of them will be described in the following description, part of them will be apparent from description, or can be known from the execution of the present invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying pictures, wherein.

DETAILED DESCRIPTION

The present invention directs to a display system and a method for adaptively adjusting resolution of a display device based on a distance of a user to the display device and user preference data corresponding to the user, by which the size of displayed content can be adjusted automatically, so as to improve both of visual comfort and operation convenience. To make the disclosure of the present invention more detailed and complete, references are made to the following description in conjunction with FIGS. 1-2. However, the devices, elements, or operations in the following embodiments are provided for exemplary purposes only.

Figure 1:
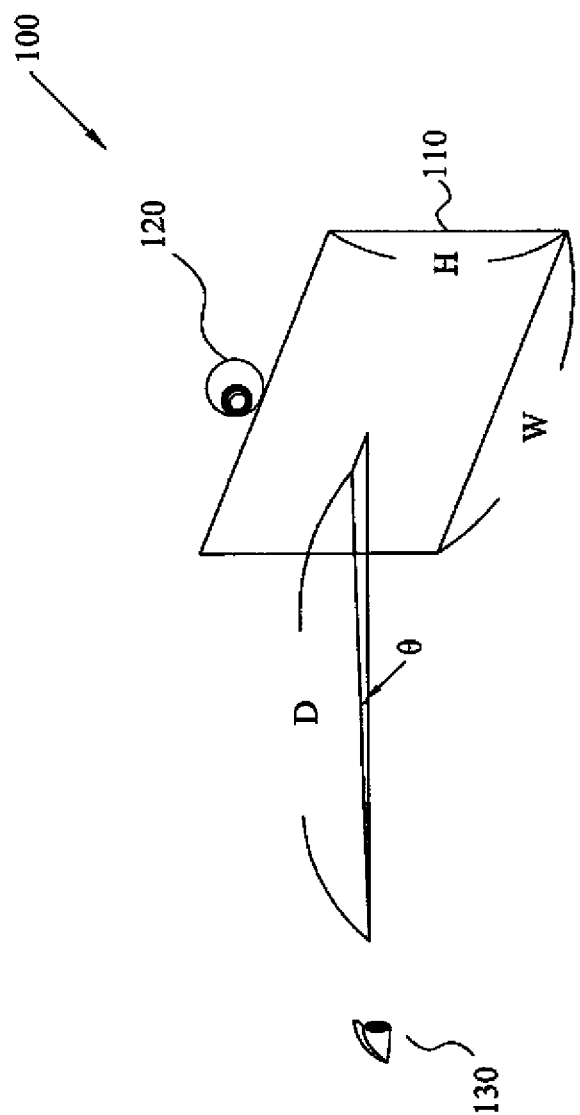
FIG. 1 is a schematic diagram showing a display system capable of adaptively adjusting resolution according to one embodiment of the present invention.

FIG. 1 is a schematic diagram showing a display system 100 capable of adaptively adjusting display resolution according to one embodiment of the present invention. Referring to FIG. 1, a display system 100 of the present embodiment includes a display device 110, an image sensor 120, and a control module (not shown and whose additional details and operation will be described in greater detail below). The display device 110 is configured to display information, and can be a liquid crystal display device, a plasma screen display device, or other pixel-based display devices. The image sensor 120 is positioned with respect to the display device 110 for capturing an image of a user 130 in front of the display device 110 and converting the image into an electrical signal which is then transmitted to the control module. The image sensor 120 can be located at any suitable places, such as at corner or upper edge of display device 110.

Initially, the face representation data and the user preference data corresponding to a plurality of users are stored in the control module (not shown). The electrical signal from the image sensor 120 is processed by the control module, using face detection and recognition techniques, to identify the facial features and determine whether any recognized face corresponds to one of the face representation data. Typically, the identification of a face may indicate that a user is viewing the display 14, and then a distance between the recognized face and the display device 110 can be determined based on any known distance detection algorithm (such as computer stereo vision technique). Referring to FIG. 1, once the control module determines that the face of the user 130 matches one of the face representation data, the control module retrieves the user preference data corresponding to the specific user 130 and adjusts the resolution of the display device 110 based on both of the distance D of the user 130 to the display device 110 and the corresponding preference data, whereby the visual angle per pixel pitch (θ) can be automatically adjusted to fit the user's viewing preferences.

Figure 2:
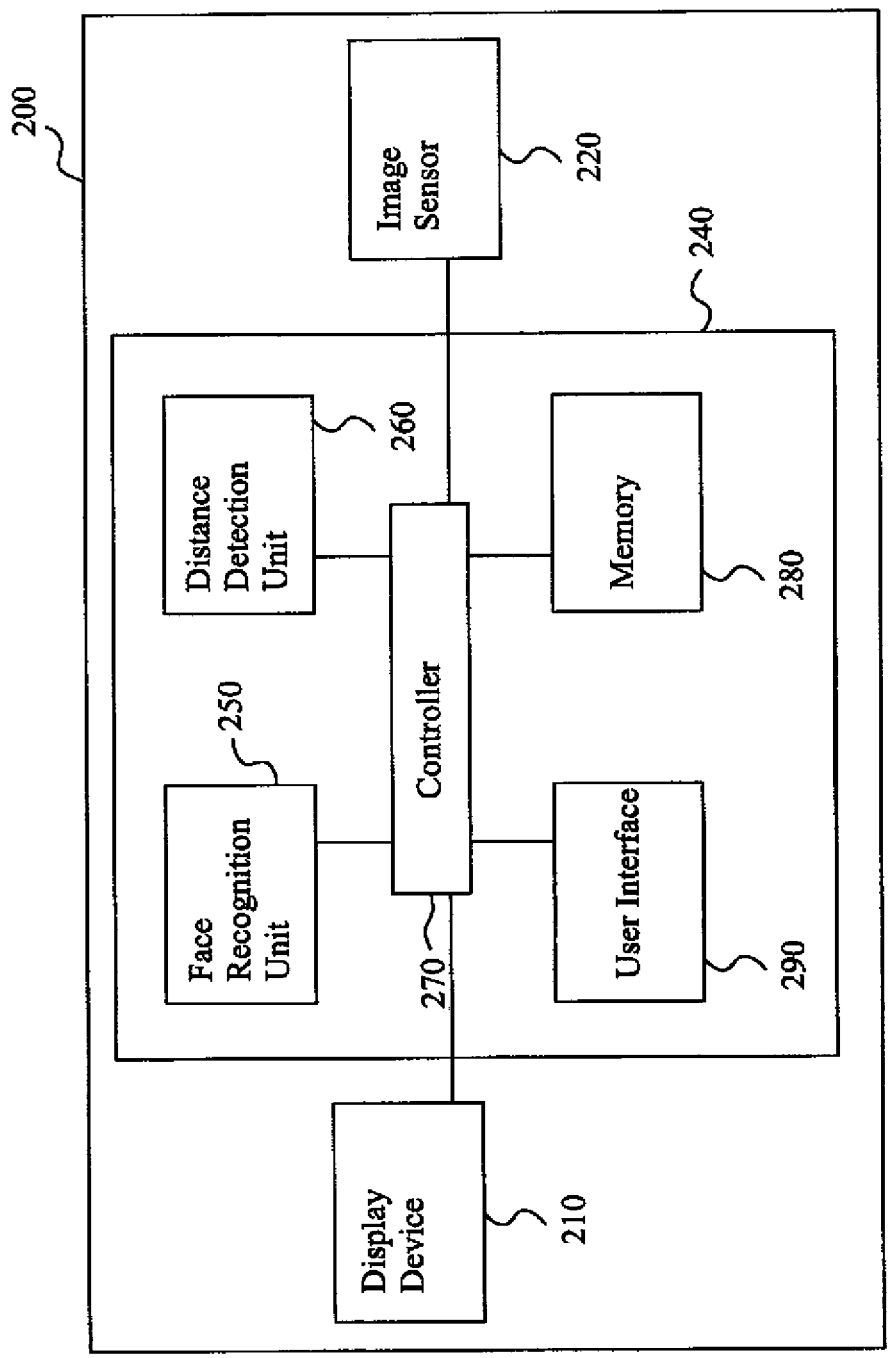
FIG. 2 is a schematic block diagram of the display system of FIG. 1.

FIG. 2 is a schematic block diagram of the display system of FIG. 1. Referring to FIG. 2, the display system 200 includes a display device 210, an image sensor 220, and a control unit 240, and the control unit 240 further includes a face recognition unit 250, a distance detection unit 260, a controller 270, a memory 280, and a user interface 290. Face representation data and user preference data corresponding to one or more users, inputted through the user interface 290, can be stored in the memory 280. The present invention does not intend to limit the number and the type of the image sensor adopted in the display system 200, for example, the image sensor 220 of the present invention can be, but not limited to, a CCD camera, a CMOS camera, a video recorder, etc. As described above, the image sensor 220 captures image of a user's face, and provides such information to the control unit 240 for adjusting the resolution of the display device 210. The detail of each part will be described below.

According to one embodiment of the present invention, the display system 200 has two operational modes: a normal operation mode and a setting mode. The display system 200 is operated in the setting mode for establishing a new record for a new user, including facial features and visual preference setting. For example, when a setting procedure is taking place, a new user may be asked to stand in front of the display device 210 at a predetermined distance, such as 50 cm, and the new user's image is captured by the image sensor 220. Then, the captured image is transmitted to the face recognition unit 250 to identify the location of the face of the new user and extract corresponding facial features, including eyes, nose, mouth, and/or image intensity gradient. These extracted facial features of the new user are stored in the memory 280. Exemplary face detection and facial recognition techniques that could be employed include eigenface, fisherface, the Hidden Markov Model, neuronal motivated dynamic link matching and three-dimensional face recognition, which are well-known by a person skilled in the art and therefore the detailed description thereof will be omitted.

The new user then can input preference data or other user-specific data through the user interface 290. The user interface 290 can take a variety of forms, such as a button, a keypad, or touch screen to permit data and control commands to be input into the control unit 240. The user preference data includes, for example, the perceived size of displayed object at a predetermined distance, the visual angle per pixel pitch, and the like. Besides, the manner for adjusting resolution, i.e. smoothness and sensitivity for resolution adjustment, is a configurable option which can vary from user to user based on the user's preference. For example, for the users who prefer to view the optimal display size all the time, the display resolution will be adjusted automatically as long as the distance change is detected. On the other hand, for the users who prefer not changing the display content frequently, the display resolution will be maintained until the variation of the detected distance is larger than a predetermined value, such as 15 cm. These users' settings are stored under the user's facial features within the memory 280.

The memory 280 is configured to store face representation data, user preference data, and any other digital data and can be implemented as, for example, one or more of a buffer, a flash memory, a hard drive, a removable media, a volatile memory, a non-volatile memory, a random access memory (RAM), or other suitable device. In a typical arrangement, the memory 280 may exchange data with the controller 270 over a data bus, and accompanying control lines and an address bus between the memory 280 and the controller 270 also may be present.

When the display system 200 is operated in the normal mode, the image sensor 220 captures an image of a user standing in front of the display device 210 and converts the image into an electrical signal which is then transmitted to the face recognition unit 250. The face recognition unit 250 detects or locates a face of the user within the image and then recognizes that the detected face is associated with one particular person by comparing the detected face image with the face representation data stored in the memory 280. Any suitable face detection and recognition technique can be used for detecting and recognizing human face. For example, face detection can be carried out using Haar-like features. Haar-like features include two kinds of features, where the first feature selected focuses on the property that the region of the eyes is often darker than the region of the nose and cheeks, and the second feature selected relies on the property that the eyes are darker than the bridge of the nose. The position of a face can be determined by combining these two features (see "Robust Real-Time Face Detection" by Paul Viola et al., International Journal of Computer Vision 57(2), 137-154, 2004, incorporated by reference). Another exemplary method of face recognition is the eigenface method (see, e.g., "Face Recognition Using Eigenfaces" by Turk et al., IEEE, 1991, hereby incorporated by reference).

After the user's face is recognized, the distance of the user to the display device 210 is determined by the distance detection unit 260, which can be implemented by any suitable distance detection techniques. One exemplary method for detecting a distance between the user and the display device 210 is based on geometric ratio principle, i.e. the captured face image is scaled to represent the user located at different distances from the camera. This method can be implemented by utilizing a single camera, such as a common web-cam mounted on the notebook. Typically, the camera is positioned in the same plane as the display device 210. The distance between the user and the display device 210 is inversely proportional to the height of the captured face image. For example, let a height of a captured face image be denoted as $H_n$ when a distance of a user to the display device 210 is $D_n$. Then, if the height of the captured face image changes to be $H_f$, the new distance $D_f$ between the user and the display device 210 can be calculated using the relationship $D_n:D_f=H_f:H_n$. Another exemplary method of distance detection is based on the time-of-flight (TOF) principle using a depth camera (such as a Zcam) and an infrared light source. The distance can be determined depending on the time difference between the direct light signal emitted from the infrared light source and the reflected light signal received by the camera. Another exemplary technique for detecting a distance is the so-called stereo image process, which is mainly based on the use of binocular disparity information and can be implemented by setting up two web-cams for rendering a stereo pair. The stereo image process is well known by a person skilled in the art and therefore the detailed description thereof will be omitted. It will be appreciated that other techniques based on an identified face may be employed for determining a distance between a user and the display device 210.

In one embodiment, after performing the above-described face detection and recognition processes, the face recognition unit 250 can generate a first signal indicative of a match between a recognized face and a specific face stored in the memory 280. In addition, the distance detection unit 260 can generate a second signal indicative of a distance of the user from the display device 210 based on the detected facial features. The controller 270 is electrically connected to the face recognition unit 250 and the distance detection unit 260 for receiving both the first and the second signals, and then retrieves the user preference data, such as visual angle per pixel, associated with the recognized face indicated by the first signal from the memory 280. Based on the detected distance and the corresponding user preference data, the controller 270 can calculate a resolution parameter and thereby adjust the resolution of the display device 210 based on the resolution parameter. In short, the information from face recognition unit 250, distance detection unit 260 and the memory 280 are all collected by the controller 270, and then resolution of the display device 210 can be correspondingly altered under the control of the controller 270 to facilitate clear viewing of the content by the user. For example, after obtaining the detected distance (D) between the user and the display device 210 and a recorded value of visual angle per pixel pitch (a) associated with the recognized face, the controller 270 can calculate the corresponding "width per pixel pitch (p)" by the following formula:

$$D = \frac{360 \times p}{2\pi \times 1000 \times a},$$

where the units of (D), (p), and (a) are meter, millimeter, and degree respectively. After the width per pixel pitch (p) is obtained, the horizontal resolution $R_w$ and vertical resolution $R_h$ can be calculated by:

$$R_w = \frac{1000 \times W}{p} = \frac{360 \times W}{2\pi \times a \times D};$$
$$R_h = \frac{1000 \times H}{p} = \frac{360 \times H}{2\pi \times a \times D};$$

where W and H are width and height of the display device 210 respectively and in the unit of meter. Based on this information, the resolution of the display device can be adjusted by the controller 270 for best visual comfort.

In one embodiment, if multiple faces are detected by the face recognition unit 250, the distance of one of the faces to the display device 210 may be used for the determined distance. For example, the distance of the closest face to the display device 210 may be used. In another embodiment, periodic updates to the face recognition and distance detection may be made. For instance, every minute or every other minute, the face recognition and distance detection may be carried out to revise the user preference determination. Then, the visual angel per pixel pitch of the display device 210 may be adjusted accordingly by changing the resolution setting of the display device 210. Further, changes to the display resolution of the display device 210 may be made in stepped increments or in a smoother progression.

It should be appreciated that the above-described techniques could be carried out in various operational environments. Therefore, the term display system, as used herein, may relate to any type of appropriate electronic equipment, examples of which include a personal computer, a portable computer, a video player, a media player, a personal digital assistant (PDA), a gaming device, etc. Furthermore, the components and the functionalities thereof discussed above for the display system 200 are by way of example only, and other components can be incorporated into the display system 200, such as a function key for allowing the user to turn off the face detection function and/or software for controlling the devices or processing data.

Many of people nowadays work for hours each day in front of display devices. It is very important to establish viewing conditions that minimize stress to our eyes. The present invention provides a display system and method capable of automatically and adaptively adjusting the visual angle per pixel pitch of the display device to assure good viewing conditions.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A display system for improving visual comfort, comprising:
   a display device;
   a memory for storing face representation data and user preference data;
   an image sensor positioned with respect to the display device for capturing an image and converting the image into an electrical signal;
   a face recognition unit for analyzing the electrical signal to recognize a face image of a user and comparing the recognized face image with the face representation data to generate a first signal;
   a distance detection unit for analyzing the electrical signal to determine a distance between the display device and the user to generate a second signal; and
   a controller electrically connected to the face recognition unit and the distance detection unit, wherein the controller retrieves one of the user preference data corresponding to the recognized face image from the memory and generates a parameter based on the first signal, the second signal, and the retrieved user preference data; and the controller adjusts a display resolution of the display device based on the parameter;
   wherein the face representation data includes facial features corresponding to a plurality of users respectively, and the user preference data includes values of visual angle per pixel pitch of the display device corresponding to the plurality of users respectively; and
   wherein the parameter includes a horizontal resolution $R_w$ and a vertical resolution $R_h$ represented as:

$$R_w = \frac{360 \times W}{2\pi \times a \times D}, \text{ and}$$

$$R_h = \frac{360 \times H}{2\pi \times a \times D},$$

where W and H are a width and a height of the display device respectively, a is a visual angle per pixel pitch associated with the recognized face image, and D is the distance between the display device and the user.

2. The display system of claim 1, further comprising a user interface for inputting the user preference data.

3. A method of adaptively adjusting resolution of a display device, comprising:
   storing face representation data and user preference data in a memory;
   capturing an image and converting the image into an electrical signal by an image sensor;
   analyzing the electrical signal to recognize a face image of a user and determine a distance between the display device and the user;
   comparing the recognized face image with the face representation data to determine a match between the recognized face image and one of the face representation data;
   retrieving one of the user preference data corresponding to the recognized face image;
   generating a parameter based on the distance and the retrieved user preference data; and
   adjusting a display resolution of the display device based on the parameter;
   wherein the face representation data includes facial features corresponding to a plurality of users respectively, and the user preference data includes values of visual angle per pixel pitch of the display device corresponding to the plurality of users respectively, and
   wherein the parameter includes a horizontal resolution $R_w$ and a vertical resolution $R_h$ represented as:

$$R_w = \frac{360 \times W}{2\pi \times a \times D}, \text{ and}$$

$$R_h = \frac{360 \times H}{2\pi \times a \times D},$$

where W and H are a width and a height of the display device respectively, a is a visual angle per pixel pitch associated with the recognized face image, and D is the distance between the display device and the user.

* * * * *